United States Patent [19]

Bidefeld

[11] Patent Number: 5,285,562
[45] Date of Patent: Feb. 15, 1994

[54] APPLICATOR APPARATUS FOR PUSH-ON TYPE FASTENERS

[75] Inventor: Branko Bidefeld, Marietta, Ga.

[73] Assignee: TRW Inc., Cleveland, Ohio

[21] Appl. No.: 988,211

[22] Filed: Dec. 9, 1992

[51] Int. Cl.5 ............................................ B25C 1/04
[52] U.S. Cl. ................................. 29/525; 227/130; 227/134
[58] Field of Search .............. 227/130, 134, 131, 132

[56] References Cited

U.S. PATENT DOCUMENTS

| | | | |
|---|---|---|---|
| 2,492,509 | 12/1949 | Vandervieren. | |
| 2,558,403 | 6/1951 | Wandel. | |
| 2,746,042 | 5/1956 | Turner. | |
| 2,765,463 | 10/1956 | De Anguera. | |
| 3,091,768 | 6/1963 | Whitney. | |
| 3,636,707 | 1/1972 | Saari et al.. | |
| 3,776,444 | 12/1973 | Kuehn et al.. | |
| 4,479,601 | 10/1984 | Hara | 227/130 |
| 4,627,563 | 12/1986 | Meyer | 227/130 |
| 5,174,486 | 12/1992 | Latal et al. | 227/130 |

Primary Examiner—Scott Smith
Attorney, Agent, or Firm—Fay, Sharpe, Beall, Fagan, Minnich & McKee

[57] ABSTRACT

An apparatus for installing a pushnut fastener on a rod or stud comprises a body having a guideway extending axially thereof with a pushrod mounted in the guideway and having a sleeve-like end portion movable between a first position extending out of the body and a second position within the body. A radially resilient tubular chuck having an open inlet end and open outlet end is joined to the body for holding a fastener in axial alignment with the sleeve-like end portion of the pushrod when the pushrod is in the first position. An air cylinder functions to move the pushrod from the second to the first position when energized and to return the pushrod to the first position when de-energized. A feed line supplies pushnut fasteners to the inlet end of the chuck when the pushrod is in the second position and a drive assembly is operable when the air cylinder is energized for driving the pushrod from the first position to a third position inwardly beyond the second position. A trigger element is arranged for selectively releasing the drive assembly after the pushrod has been driven to the third position to permit the air cylinder and pushrod to suddenly return to the first position and drive the fastener into its located position on the rod or stud.

16 Claims, 3 Drawing Sheets

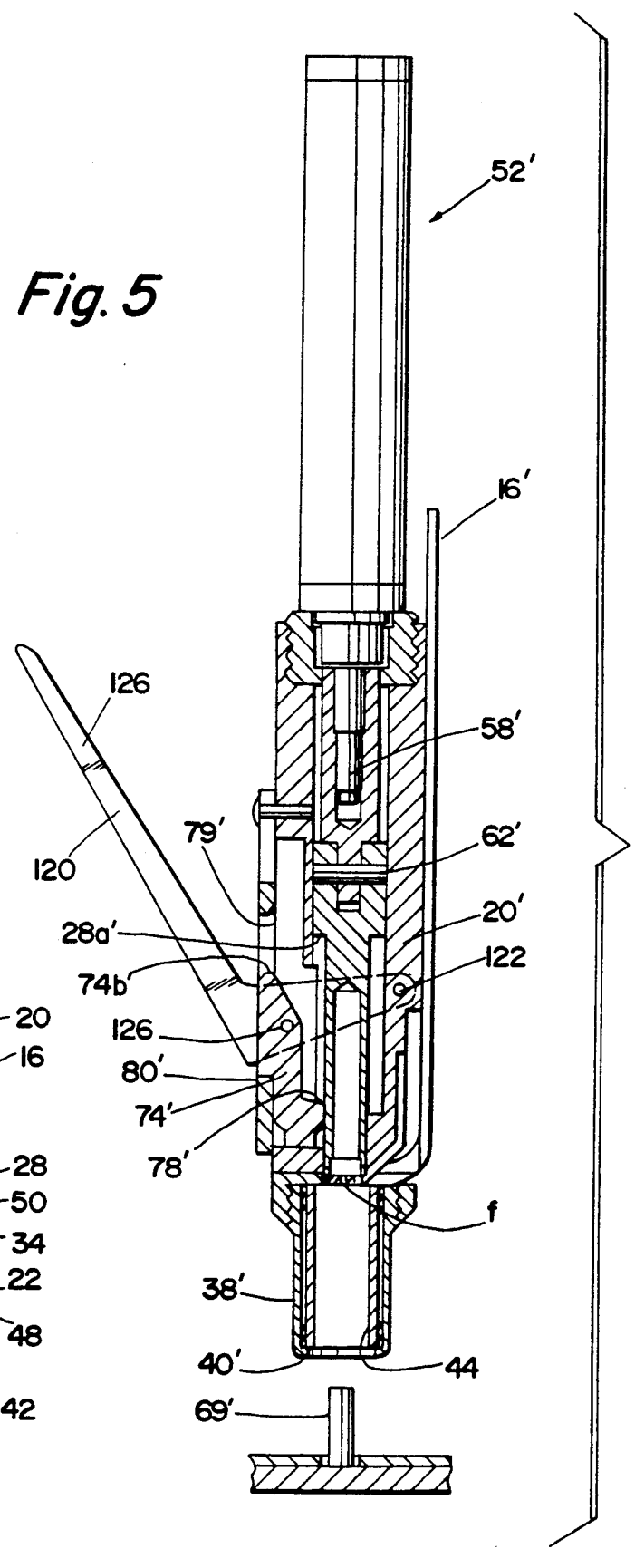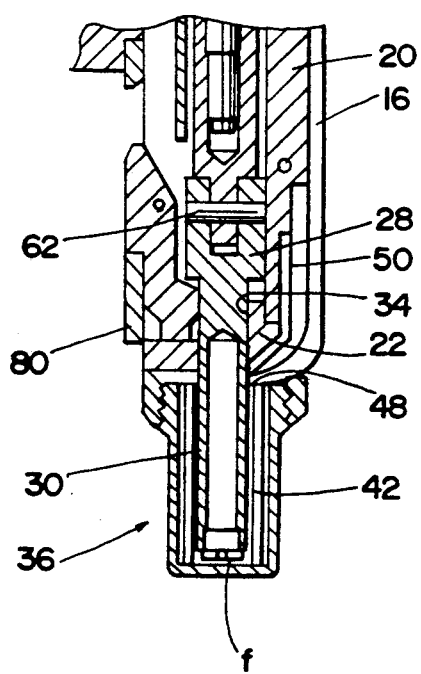

APPLICATOR APPARATUS FOR PUSH-ON TYPE FASTENERS

BACKGROUND OF THE INVENTION

The subject invention is directed to the fastener art and, more particularly, to an apparatus for facilitating the installation of fasteners.

The invention is especially suited for installing pushnut fasteners to the ends of studs or rods and will be described with reference thereto; however, the invention is capable of broader application and could be used for installing a variety of similar fastening devices.

Pushnut fasteners are widely used for providing rapid, simple connections to both threaded and unthreaded rods and studs. Generally, the fasteners are applied by aligning them with the rod or stud and manually driving them into position with various types of hand tool applicators. As a result, installation is both slow and cumbersome. Consequently, there has existed a need for apparatus to automatically install such fasteners and eliminate or reduce the amount of manual manipulation and force application required.

SUMMARY OF THE INVENTION

In accordance with the invention, there is provided apparatus for installing a pushnut fastener on a rod or a stud. The apparatus generally comprises an elongated main housing body having first and second axially spaced ends with a guideway extending axially inward from the first end. A pushrod is carried in the guideway and has a sleeve-like end portion movable between a first extended position and a second retracted position. A cylindrical chuck means having an inlet end and an outlet end and adapted to resiliently grip and hold the outer periphery of a pushnut fastener is joined to the body with its inlet end in axial alignment with the guideway to surround the sleeve-like end portion of the pushrod when it is in the first position. First power means are provided for moving the sleeve-like end portion of the pushrod from the second to the first position when energized and then returning to the second position when de-energized. Means are provided for supplying pushnut fasteners to the inlet end of the chuck when the sleeve-like end portion of the pushrod is in the second position. Additionally, associated with the apparatus are drive means operable when the first power means is energized for driving the sleeve-like end portion of the pushrod from the first position to a third position beyond the second position. Control means act for selectively releasing the drive means only after the sleeve-like end portion of the pushrod has been driven to the third position to permit the first power means and pushrod to suddenly return to the first position.

Preferably, the drive means includes an air cylinder second power means; however, it is possible for the second power means to be a manually-operable lever.

In accordance with a somewhat more limited aspect of the invention, the control means includes a trigger mechanism which acts to disconnect the drive means from the pushrod when the sleeve-like end portion has reached the third position. This allows sudden release of the pushrod to move with great force to the final extended position. During this movement, the pushnut is driven into its engaged position on the stud or rod to which it is being applied.

In its preferred form, the first and second power means comprise single-action air cylinders. Additionally, the trigger mechanism is preferably a pivoted cam plate which suddenly disconnects the drive connection between the second power means and the pushrod when the sleeve-like portion of the pushrod has reached the third position.

As can be seen from the foregoing, a primary object of the invention is the provision of a simple and effective apparatus for automatic application of pushnut fasteners.

A further object is the provision of an apparatus of the type described which uses fluid power cylinders for both fastener application and control.

Yet another object is the provision of a fastener applying device which allows either manual or automatic control.

BRIEF DESCRIPTION OF THE DRAWINGS

The above and other objects and advantages will become apparent from the following description when read in conjunction with the accompanying drawings wherein:

FIG. 4 is the circled portion of FIG. 2, but showing the pushrod in an extended position; and, FIG. 5 is a vertical cross section through a modified form of the apparatus.

DETAILED DESCRIPTION OF THE PREFERRED AND ALTERNATE EMBODIMENTS

Figure 1:
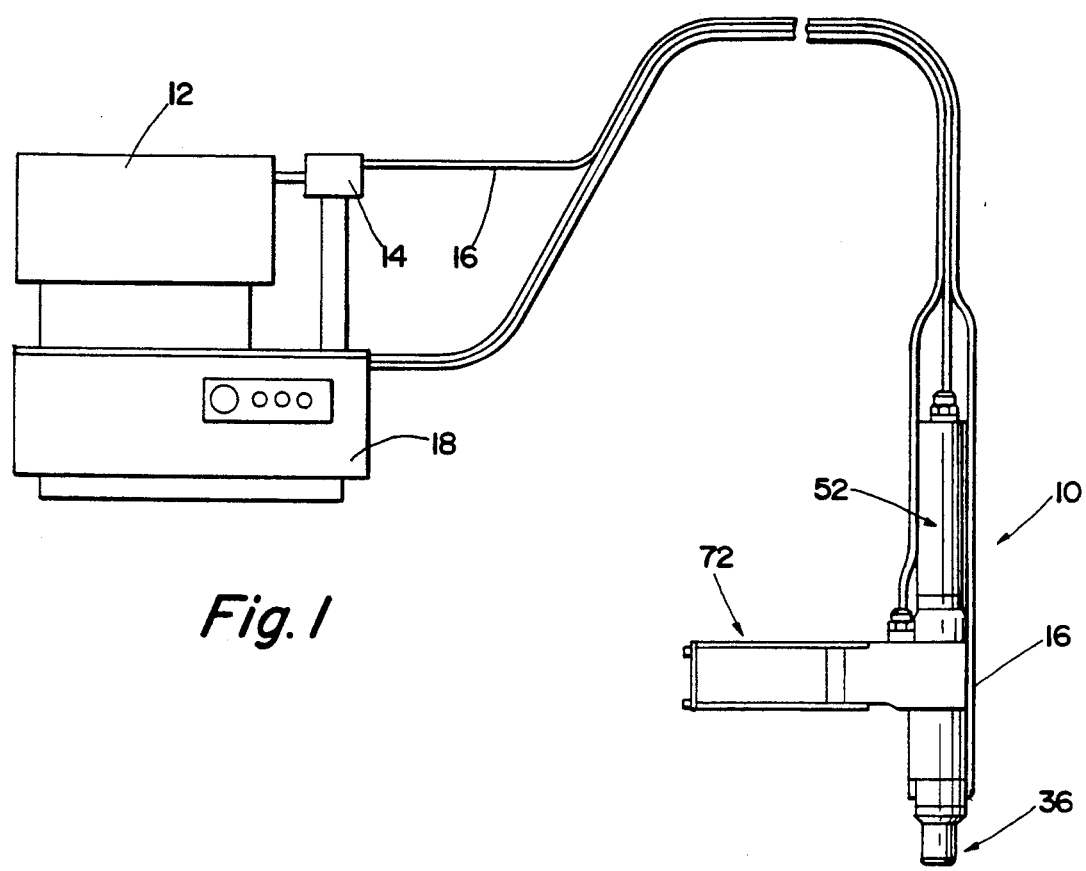
FIG. 1 is a somewhat diagrammatic view of the applicator tool apparatus and its associated feed and control mechanisms.

Referring more particularly to the drawings wherein the showings are for the purpose of illustrating preferred embodiments of the invention only, and not for the purpose of limiting same, FIG. 1 shows the overall arrangement of a system incorporating the inventive pushnut fastener applying tool 10. The overall system is illustrated somewhat diagrammatically and comprises a conventional vibratory bowl-type fastener feeder 12 which is connected to the applicator tool 10 through an escapement mechanism 14 and a fastener feed tube 16. The feeder 12 and related structure form no particular part of the subject invention, but are illustrated merely to provide a complete understanding of the fastener applying tool and the preferred system in which it is to be used. The feed tube 16 is merely an extruded plastic tube which has a cross section suitable for receiving and conducting the pushnut fasteners to the chuck portion of the tool in a manner subsequently to be described. In this preferred embodiment, the pushnut fasteners are generally of the type shown and described in the commonly-assigned copending application entitled "Push-on Type Fastener for Automatic Feed and Installation Equipment", Ser. No. 07/916,512, filed Jul. 20, 1992 which is incorporated herein by reference. Associated with the vibratory bowl feeder 12 is a control and air supply assembly 18 which provides the necessary air for operating the power means of the applicator 10 and also controls and sequences the supply of the air as required for proper functioning of the unit.

Figure 3:
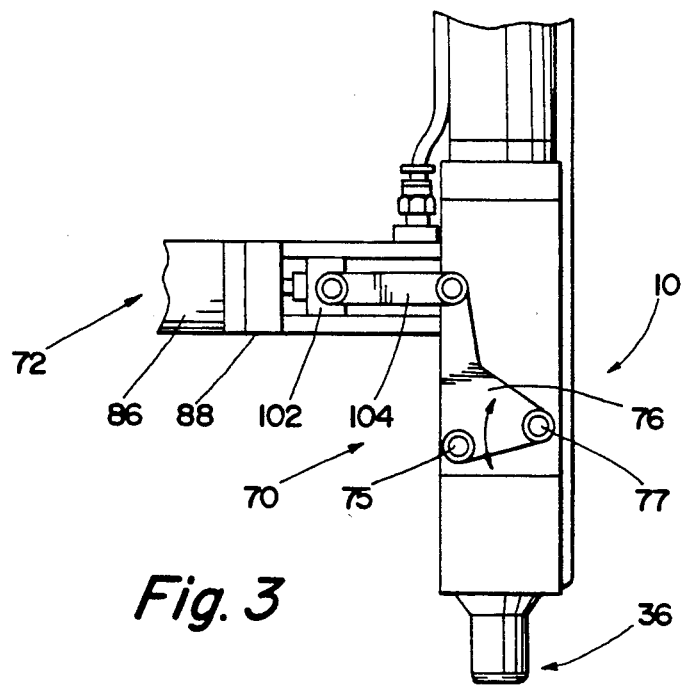
FIG. 3 is a partial side view of the applicator tool with a portion of the outer housing or shroud removed.
Figure 2:
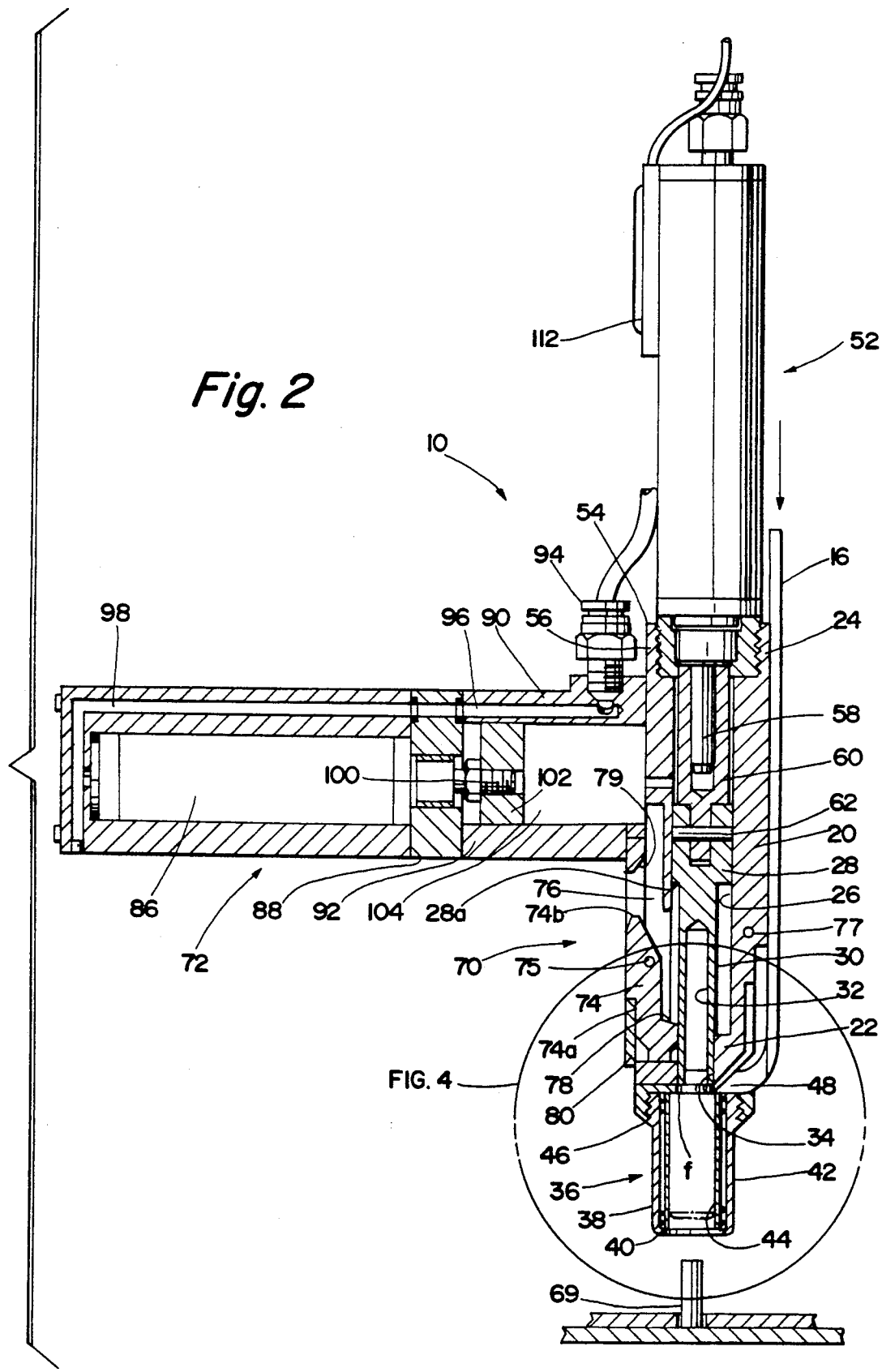
FIG. 2 is a vertical cross-sectional view through the preferred form of the applicator tool apparatus.

As discussed above, the overall specifics of the feed and control arrangements form no part of the subject invention and could take many forms. Of importance to the subject invention is, however, the overall construction and arrangement of the applicator apparatus or tool 10 which is best illustrated in FIGS. 2 through 4. As illustrated therein, the apparatus generally comprises an elongated main housing or body 20 which is formed of a suitable material such as aluminum or steel and has first and second axially-spaced end portions 22 and 24. In the preferred embodiment, the body 20 is of generally cylindrical shape and has a cylindrical guideway 26 formed axially thereof between the first end 22 and the second end 24.

Mounted for reciprocatory movement within the guideway 26 is a pushrod member 28. The pushrod member has a reduced diameter cylindrical sleeve-like end portion 30 which has an inwardly extending opening 32 of a diameter greater than the diameter of the studs or rods to which the pushnuts are to be applied. The reduced diameter sleeve-like portion 30 extends freely through a reduced diameter outer end section 34 of the guideway 26. The end of the sleeve-like portion 30 serves as the applicator for the pushnuts in a manner subsequently to be described. As can be appreciated, the pushrod element 28 can be formed of a variety of materials, but is preferably formed from a relatively high-strength and wear-resistant alloy steel.

Connected to the first end of the housing 20 is a cylindrical sleeve-like collet means 36. The collet means 36 comprises a rigid metal outer sleeve portion 38 which is open at its opposite ends and terminates at its lower end in a radially inward extending flange 40. Carried within the collet means 36 is a sleeve portion 42 which has an open inner diameter 44 which is somewhat smaller than the outer diameter of the pushnut elements. The inner sleeve-like portion 42 is radially resilient and is formed from a heat treated beryllium copper which is slotted to provide the necessary radial resiliency to allow it to resiliently grip the periphery of the fasteners. Although forming no particular part of the invention, the sleeve and collet means 38 is preferably joined to the lower end of the body 20 in a manner to permit ready release and disconnection for maintenance purposes and the like. In the subject embodiment, the connection means is simple mechanical threads 46 positioned as shown.

The tube 16 is connected to supply the pushnut fasteners to a position at the inlet end of the collet means 36. As illustrated in FIGS. 2 and 4, the feed tube 16 extends along the exterior of the body 20 and has its lower end connected inwardly to a slot or opening 48 between the lower end 22 of the body 20 and the inlet end to the collet means 36. The fasteners supplied through tube 16 are thus directed to a position at the inlet end of collet means 36 and axially aligned with the sleeve-like lower end 30 of the pushrod 28.

In the subject embodiment, movement of the pushrod 28 from the first extended position (shown dotted) to the second retracted position (shown solid) is achieved through the use of a first air cylinder power means 52 which is suitably mounted at the second or upper end 24 of the body 20. Cylinder 52 is, in this embodiment, a single-action cylinder in which there is a spring operable to move the piston and rod of the cylinder to move the pushrod 28 to the solid line position shown in FIG. 2 when the cylinder is de-energized. As illustrated, the cylinder is threadedly connected to an intermediate threaded sleeve 54 which is carried in a threaded connection 56 at the upper end 24 of the body 20. The cylinder's output rod 58 is, in turn, connected with the pushrod 28 by a cross pin 62 and an intermediate connector piece 60.

As can be appreciated, in the subject embodiment the control means 18 shown in FIG. 1 is arranged so as to allow a fastener to come from the escapement means 14 through the tube 16 to the upper end of the collet 36 only when the pushrod is in the retracted (solid line) position as a result of the power cylinder 52 being de-energized. With the components in the position illustrated in FIG. 2, the tool is subsequently moved down into position on the threaded rod or stud 69 to which the fastener f is to be applied. Thereafter, the air cylinder 52 is energized. This advances the pushrod 28 thus moving the pushrod and the fastener to the ready position shown in FIG. 4. The air pressure supplied to the cylinder 52 is not sufficient to drive the fastener f into final position on the stud 69. However, subsequently, the cylinder 52 with the air energization is caused to be retracted rearwardly pulling the pushrod 30 away from the fastener and further compressing the air within cylinder 52. At a predetermined point subsequently to be described, the pushrod is suddenly released and the compressed air within the cylinder 52 causes the pushrod to be accelerated downwardly to drive the fastener onto its final located position on stud 69. The preferred embodiment uses a trigger mechanism 70 and a second power means in the form of a second air cylinder assembly 72 to achieve this compression and release function.

The trigger mechanism 70 comprises a first pivotally mounted trigger element 74 that is carried by a pair of identical pivot plates 76 mounted on opposite sides of body 20 (see FIG. 3). Each of pivot plates 76 is mounted for pivotal movement about a suitable pivot shaft 77 extending through body 20. The trigger element 74 is mounted for free tilting movement about a shaft 75 which extends between the plates 76 as seen in FIGS. 2 and 3. Thus, rotation of the pivot plates 76 in a clockwise direction as viewed in FIG. 3 causes the trigger element 74 to move upwardly from the solid line position of FIG. 2.

To understand the operation of the trigger mechanism, it should be noted that the trigger element 74 has a shoulder portion 78 which is adapted to engage the shoulder 28a on pushrod 28. As the trigger element 74 moves upwardly, the engagement between shoulders 78 and 28a is maintained since the pivotally mounted trigger 74 is retained in the position shown because of slidable engagement between an outer guide plate so and the back or left-hand wall 74a of trigger element 74. As the trigger element 74 continues to move upwardly, however, engagement takes place between the inclined cam surface 74b and a corresponding cam surface 79 carried on body 20. The cam surface 79 is located at a position such that engagement between cam surface 74b and cam surface 79 takes place at about the same time as the trigger element 74 passes the plate 80. The trigger is thus caused to pivot in a clockwise direction releasing the contact and engagement between shoulders 78 and 28a. At the time of release, the air within cylinder 52 is in a highly compressed state, and the pushrod is driven outwardly of the body 20 with great force to drive the fastener f into final located position on the pushrod 69.

In the embodiment of FIG. 2, the means for retracting and producing release of the trigger mechanism or member 74 comprises the previously-mentioned second air cylinder power means 72. As illustrated, the second air cylinder power means 72 comprises a single-action air cylinder 86 which is suitably connected to extend laterally from the body 20. Preferably, the cylinder 86 is threadedly mounted in a mounting plate 88 carried by a pair of generally parallel support plates 90 and 92 which are welded or otherwise rigidly connected to body 20 and extend laterally therefrom. As illustrated, air is supplied to the cylinder 86 through a connection 94 and suitable passageways 96 and 98.

The output rod 100 from the piston or cylinder 86 is connected with a cross member 102 that is guided between support plates 90 and 92. The upper ends of pivot plates 76 are drivingly connected with cross member 102 by a pair of links 104 (see FIG. 3) that have their free ends pivotally connected as shown. As can readily be seen, when the air cylinder 86 is energized, the pivot plates 76 are rotated to drive the trigger element upwardly as previously discussed.

In the subject preferred embodiment, supply of air to cylinder 86 and control of the release mechanism is achieved through the use of a manually operable switch 102 which controls the supply of air from the control assembly 18. Alternatives to the pneumatic second air cylinder power means 72 of the preferred embodiment include various electro-mechanical actuators or solenoids as would be apparent to those skilled in the art. In the secondary alternative, the solenoid(s) may be directly pivotally connected to the trigger element 74 via shaft 75.

FIG. 5 illustrates a second embodiment of the invention which uses a simple manually-operable lever to compress the air within the main power cylinder and produce the sudden triggered release of the cylinder and the pushrod. Accordingly, duplicate reference numerals have been used but differentiated from the FIGS. 2 through 4 embodiment by the addition of a prime (') suffix. A description of one such element is to be taken as equally applicable to the correspondingly numbered element of the FIG. 5 embodiment unless otherwise noted. Specifically, in the FIG. 5 embodiment there is a manually-operable rigid lever member 120 which is pivotally connected to the body 20' by a transversely extending pivot pin 122. The lever 120 includes a horizontally extending or transverse portion 124 and a manually-engagable, somewhat upwardly extending portion 126. The portion 124 has a pivot pin 126 which is connected to the trigger member 74'. In this embodiment, when the inner cylinder 52 is energized, the pushrod 28' moves to the same forward position discussed with reference to the FIGS. 2 through 4 embodiment. At this time, engagement takes place between the shoulder 78' and the shoulder 28a'. Movement of the lever 126 in a clockwise direction however, causes the pushrod to be retracted against the air within cylinder 52 compressing the air to a higher pressure level and releasing the trigger element 74 at the upper end when engagement between surfaces 79' and 74b' takes place in the manner previously discussed. At this time, the pushrod 28' is driven forward with great force to apply the fastener to the stud or rod element 69 in the manner previously discussed.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Apparatus for installing a pushnut fastener on a rod or stud comprising:
   an elongated main housing body having first and second axial ends;
   a guideway extending axially inward from the first end of the body;
   a pushrod mounted in the guideway with a sleeve-like end portion, the pushrod being movable between a first position extending out of the body and a second position within the body;
   a radially resilient tubular chuck having an open inlet end and open outlet end, the chuck having its inlet end joined to the body in axial alignment with the guideway to surround the sleeve-like end portion of the pushrod when the pushrod is in the first position;
   an air cylinder first power means for moving the pushrod from the second to the first position when energized and returning the pushrod to the second position when de-energized;
   feed means operable for supplying pushnut fasteners to the inlet end of the chuck when the pushrod is in the second position;
   drive means operable when the first power means is energized for driving the pushrod from the first position to a third position beyond the second position; and,
   trigger means for selectively releasing the drive means after the pushrod has been driven to the third position to permit the first power means to suddenly return the pushrod to the first position.

2. Apparatus as defined in claim 1 wherein the drive means includes an air cylinder second power means.

3. Apparatus as defined in claim 1 wherein the trigger means includes a connecting member which disengages from the pushrod when at the third position.

4. Apparatus as defined in claim 3 wherein the connecting member is mounted for pivotal movement between a connected and disconnect position.

5. Apparatus as defined in claim 4 including cam surfaces for producing movement of the connecting member between its connected and disconnected positions.

6. Apparatus as defined in claim 1 wherein the drive means comprises a second air cylinder that is connected to the pushrod by a drive connection which includes the trigger means.

7. Apparatus as defined in claim 6 wherein the drive connection further includes a cam plate assembly mounted for reciprocation in a direction transversely of the pushrod.

8. Apparatus as defined in claim 1 wherein the drive means includes a manually operable lever connected to the pushrod by a drive connection which includes the trigger means.

9. Apparatus as defined in claim 8 wherein the trigger means includes a pivoted connecting member.

10. Apparatus for installing a pushnut fastener on a rod or stud comprising:
    an elongated main housing body having first and second axial ends with a guideway extending axially inward from the first end;
    a pushrod carried in the guideway with a sleeve-like end portion movable between a first extended position and a second retracted position;
    a cylindrical chuck means having an inlet end and an outlet end and adapted to resiliently grip the outer periphery of a pushnut fastener, the chuck means having its inlet end joined to the body in axial alignment with the guideway to surround, the sleeve-like end portion of the pushrod when the pushrod is in the first position;

an air cylinder first power means for moving the sleeve-like end portion of the pushrod from the second to the first position when energized and returning to the second position when de-energized;

feed means operable for supplying pushnut fasteners to the inlet end of the chuck when the sleeve-like end portion of the pushrod is in the second position;

drive means operable when the first power means is energized for driving the sleeve-like end portion of the pushrod from the first position to a third position inwardly of the body beyond the second position; and, control means for selectively releasing the drive means only after the sleeve-like portion of the pushrod has been driven to the third position to permit the first power means to suddenly return the pushrod to the first position.

11. Apparatus as defined in claim 10 wherein the drive means includes an air cylinder second power means.

12. Apparatus as defined in claim 10 wherein the control means includes a trigger mechanism which disconnects the drive means from the pushrod when the sleeve-like end portion is in the third position.

13. Apparatus as defined in claim 12 wherein the trigger mechanism includes a connecting member which pivots between connected and disconnected positions.

14. Apparatus as defined in claim 13 including cooperating cam surfaces for producing pivotal movement of the connecting member.

15. A method of operating a tool for applying annular fasteners to a stud element, the method comprising the steps of:

coaxially receiving the annular fastener into a radially resilient tubular chuck on a housing;

moving a pushrod in the housing along the shared fastener and chuck axis in a first axial direction using a pneumatic power means generating a first pneumatic translational force on the pushrod;

engaging and drivingly forcing the annular fastener further into the chuck in said first axial direction using said pushrod;

mechanically urging said pushrod in a second direction opposite the first against said first pneumatic translational force until the pushrod reaches a first predefined position in the housing; and, quickly releasing said pushrod from said first predefined position to re-engage and drivingly force said fastener completely through said tubular chuck and onto said stud element in said first direction.

16. The method according to claim 15 wherein the pushrod moving step includes moving the pushrod in the housing along the shared fastener and chuck axis in said first axial direction against a biasing spring force.

* * * * *